United States Patent
Li et al.

(10) Patent No.: US 6,825,643 B2
(45) Date of Patent: Nov. 30, 2004

(54) POWER CONVERTER MODULE WITH AN ELECTROMAGNETICALLY COUPLED INDUCTOR FOR SWITCH CONTROL OF A RECTIFIER

(75) Inventors: Chih-Sheng Li, Chung-Ho (TW); Meng-Feng Chen, Chung-Ho (TW); Chien-Chi Hsu, Chung-Ho (TW)

(73) Assignee: Micro-Star Int'l Co., Ltd., Chung-Ho (TW)

( * ) Notice: Subject to any disclaimer, the term of this patent is extended or adjusted under 35 U.S.C. 154(b) by 30 days.

(21) Appl. No.: 10/396,065

(22) Filed: Mar. 24, 2003

(65) Prior Publication Data

US 2004/0189268 A1 Sep. 30, 2004

(51) Int. Cl.[7] ................................. G05F 1/40
(52) U.S. Cl. ........................................ 323/282
(58) Field of Search ........................... 323/222, 223, 323/225, 268, 271, 282, 290; 363/84, 89, 90, 125, 127

(56) References Cited

U.S. PATENT DOCUMENTS

| | | | | |
|---|---|---|---|---|
| 4,347,474 A | * | 8/1982 | Brooks et al. ............... 323/224 |
| 5,959,442 A | * | 9/1999 | Hallberg et al. ............. 323/282 |
| 5,982,160 A | * | 11/1999 | Walters et al. ............... 323/282 |
| 6,064,187 A | * | 5/2000 | Redl et al. .................... 323/285 |
| 6,525,516 B2 | * | 2/2003 | Schultz et al. ............... 323/282 |
| 6,580,259 B2 | * | 6/2003 | Liu et al. ..................... 323/282 |

* cited by examiner

Primary Examiner—Matthew V. Nguyen
(74) Attorney, Agent, or Firm—Winston Hsu

(57) ABSTRACT

A power converter module includes a wave generator, a rectifier, and a switch controller. The rectifier includes first and second power switches, and an LC circuit. The switch controller is coupled electrically to the wave generator and control terminals of the first and second power switches, and includes a control coil coupled electromagnetically to an inductor coil of the LC circuit. The switch controller can turn the first power switch on and off periodically in response to a periodic output of the wave generator, and can ensure that the second power switch is turned off when the first power switch is turned on, and that the second power switch is turned on when the first power switch is turned off.

12 Claims, 2 Drawing Sheets

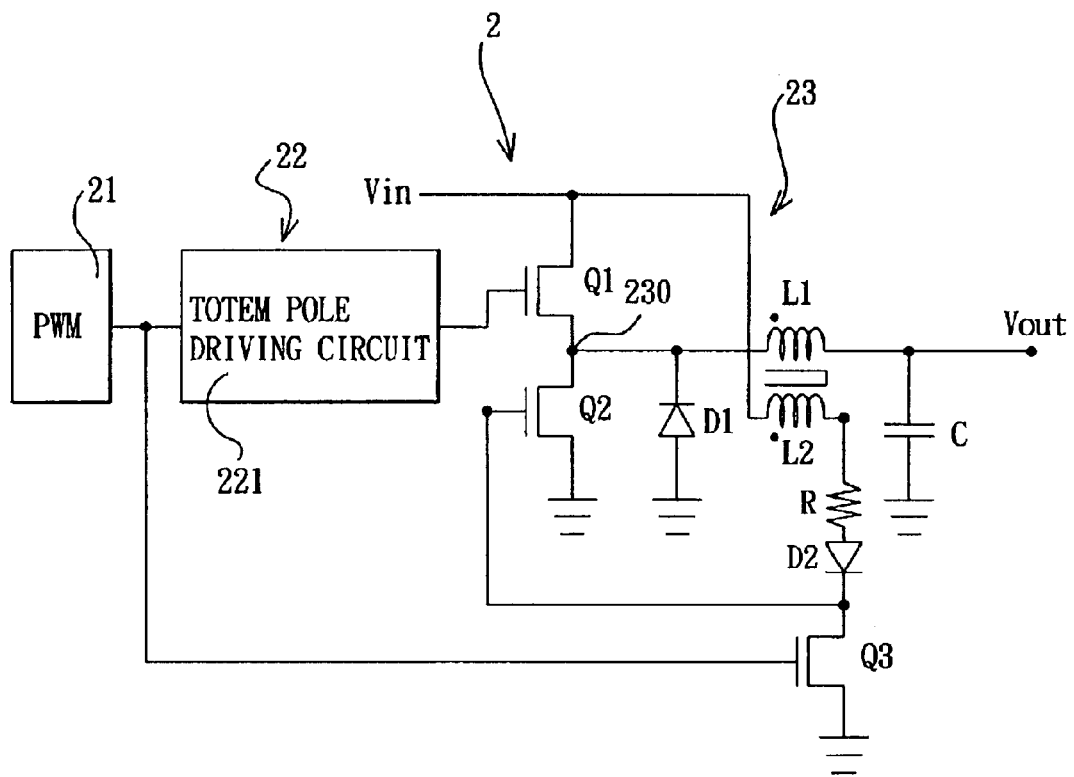
F I G. 2

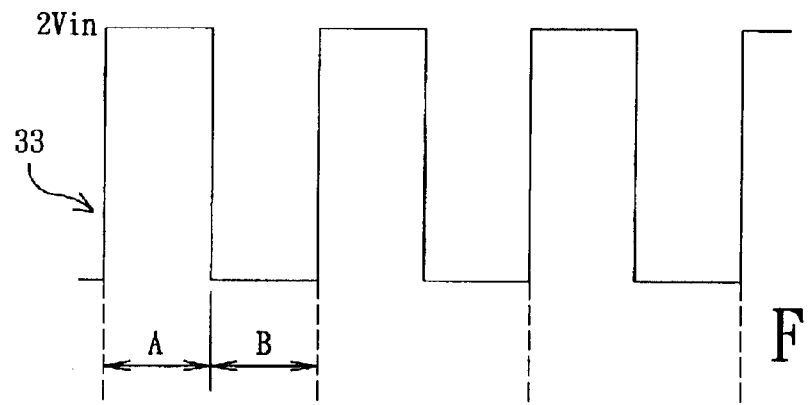
FIG. 3
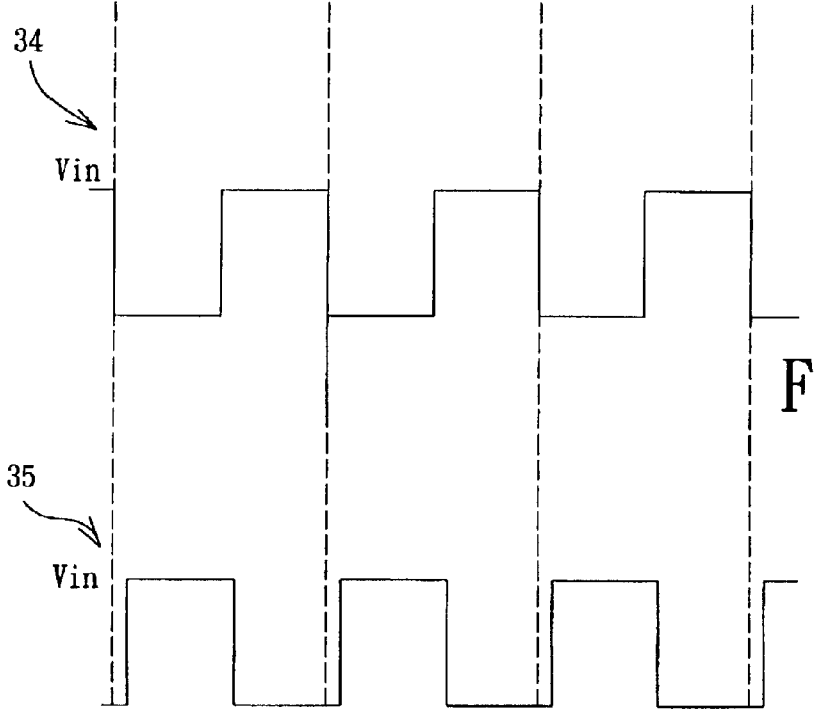
FIG. 4
FIG. 5

POWER CONVERTER MODULE WITH AN ELECTROMAGNETICALLY COUPLED INDUCTOR FOR SWITCH CONTROL OF A RECTIFIER

BACKGROUND OF THE INVENTION

1. Field of the Invention

The invention relates to a power converter module, more particularly to a power converter module with an electromagnetically coupled inductor for switch control of a rectifier.

2. Description of the Related Art

Referring to FIG. 1, a conventional power converter module 1 for DC-to-DC conversion is shown to include a wave generator 11, a rectifier 13, and a switch controller 12. The wave generator 11, such as a pulse width modulator (PWM), has an output terminal that provides a periodic control signal. The rectifier 13, such as a step-down synchronous rectifier, includes first and second NMOS power switches 131, 132. The first power switch 131 has a first switch terminal coupled electrically to a voltage source (Vin), a second switch terminal, and a control terminal. The second power switch 132 has a first switch terminal coupled electrically to the second switch terminal of the first power switch 131, a grounded second switch terminal, and a control terminal. The switch controller 12 is in the form of an integrated circuit that interconnects the output terminal of the wave generator 11 and the control terminals of the first and second power switches 131, 132. The switch controller 12 provides a first switch control signal 121 that corresponds to the periodic control signal from the wave generator 11 to the control terminal of the first power switch 131, and further provides a second switch control signal 122 that is 180-degrees out of phase with respect to the first switch control signal 121 to the periodic control signal to the control terminal of the second power switch 132 such that the first and second power switches 131, 132 are turned on and off alternately and periodically. The first and second switch control signals 121, 122 have duty cycles that can be adjusted to produce a desired direct current (DC) voltage (Vout) at an output of the rectifier 13. However, the switch controller 12 of the conventional power converter module 1 is a relatively expensive component having a driving capability that cannot be adjusted as desired.

SUMMARY OF THE INVENTION

Therefore, the object of the present invention is to provide a power converter module that includes a relatively low cost and simple switch controller so as to overcome the aforesaid drawbacks of the prior art.

According to the present invention, a power converter module comprises a wave generator, a rectifier, and a switch controller. The wave generator has an output terminal that provides a periodic control signal. The rectifier includes first and second power switches, and an LC circuit. The first power switch has a first switch terminal adapted to be coupled electrically to a voltage source, a second switch terminal, and a control terminal. The second power switch has a first switch terminal coupled electrically to the second switch terminal of the first powers witch, a grounded second switch terminal, and a control terminal. The LC circuit is coupled electrically to the second switch terminal of the first power switch and the first switch terminal of the second power switch. The LC circuit includes an inductor coil. The switch controller is coupled electrically to the wave generator and the control terminals of the first and second power switches. The switch controller provides a switch control signal corresponding to the periodic control signal to the control terminal of the first power switch such that the first power switch is turned on and off periodically. The switch controller includes a control coil coupled electromagnetically to the inductor coil. The control coil has a first coil terminal adapted to be coupled electrically to the voltage source, and a second coil terminal coupled electrically to the control terminal of the second power switch. The inductor coil induces a negative voltage onto the control coil to turnoff the second power switch when the first power switch is turned on. The control coil is adapted to couple the voltage source to the control terminal of the second power switch to turn on the second power switch when the first power switch is turned off.

BRIEF DESCRIPTION OF THE DRAWINGS

Other features and advantages of the present invention will become apparent in the following detailed description of the preferred embodiment with reference to the accompanying drawings, of which:

FIG. 2 is a schematic circuit diagram of the preferred embodiment of a power converter module according to the present invention;

FIG. 3 is a plot illustrating a first switch control signal provided to a control terminal of a first power switch of a rectifier according to the preferred embodiment;

FIG. 4 is a plot illustrating a second switch control signal provided to a control terminal of a second power switch of the rectifier according to the preferred embodiment; and FIG. 5 is a plot illustrating a periodic signal produced at a junction of a second switch terminal of the first power switch, a first switch terminal of the second power switch and an LC circuit of the rectifier according to the preferred embodiment.

DETAILED DESCRIPTION OF THE PREFERRED EMBODIMENT

Figure 1:
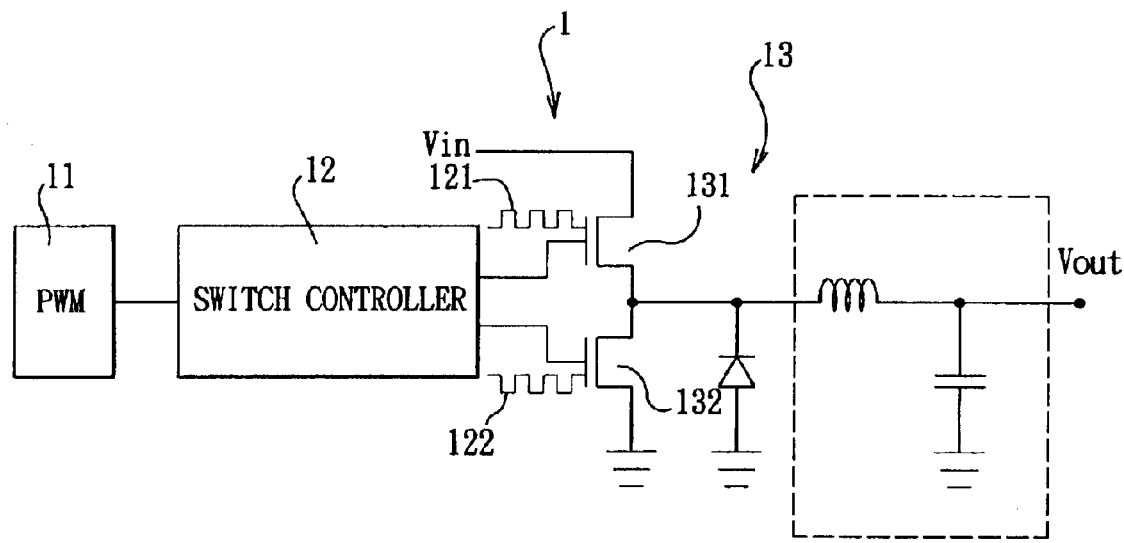
FIG. 1 is a schematic circuit diagram of a conventional power converter module.

Referring to FIGS. 2 and 3, the preferred embodiment of a power converter module 2 according to the present invention is shown to include a wave generator 21, a rectifier 23, and a switch controller 22.

The wave generator 21 has an output terminal that provides a periodic control signal. The periodic control signal has a duty cycle that is adjustable. In this embodiment, the wave generator 21 is a pulse width modulator (PWM).

The rectifier 23, which is a step-down synchronous rectifier in this embodiment, includes first and second power switches (Q1), (Q2), an LC circuit, and a first diode (D1). The first power switch (Q1) has a first switch terminal coupled electrically to a voltage source (Vin) a second switch terminal, and a control terminal. The second power switch (Q2) has a first switch terminal coupled electrically to the second switch terminal of the first power switch (Q1), a grounded second switch terminal, and a control terminal. The LC circuit includes an inductor coil (L1) and a capacitor (C). The inductor coil (L1) has a first coil terminal coupled electrically to the second switch terminal of the first power switch (Q1) and the first switch terminal of the second power switch (Q2), and a second coil terminal from which a rectifier output (Vout) can be obtained. The capacitor (C) has a first capacitor terminal coupled electrically to the second coil terminal of the inductor coil (L1), and a grounded second capacitor terminal. The first diode (D1) has a cathode terminal coupled electrically to a junction 230 of the second switch terminal of the first power switch (Q1), the first switch terminal of the second power switch (Q2) and the first coil terminal of the inductor coil (L1), and a grounded anode terminal. Preferably, the first and second power switches (Q1), (Q2) are NMOS transistors.

The switch controller 22 comprises a totem pole driving circuit 221 and a control coil (L2). The totem pole driving circuit 221 interconnects the output terminal of the wave generator 21 and the control terminal of the first power switch (Q1). In this embodiment, the totem pole driving circuit 221 provides a first switch control signal 33 corresponding to the periodic control signal to the control terminal of the first power switch (Q1) such that the first power switch (Q1) is turned on and off periodically. The first switch control signal 33 has on and off subperiods (A), (B) and amplitudes that vary between 0 volt and a voltage twice that of the voltage source (Vin), as best shown in FIG. 3. The control coil (L2) is coupled electromagnetically to the inductor coil (L1), and has a first coil terminal coupled electrically to the voltage source (Vin) and a second coil terminal coupled electrically to the control terminal of the second power switch (Q2). In the present invention, the inductor coil (L1) induces a negative voltage onto the control coil (L2) to turn off the second power switch (Q2) when the first power switch (Q1) is turned on, and couples the voltage source (Vin) to the control terminal of the second power switch (Q2) to turn on the second power switch (Q2) when the first power switch (Q1) is turned off. Preferably, the control coil (L2) is wound around the inductor coil (L1) and in the same direction as the inductor coil (L1) such that the negative voltage induced by the inductor coil (L1) onto the control coil (L2) has a magnitude equal to the voltage supplied by the voltage source (Vin).

The switch controller 22 further includes a series connection of a resistor (R) and a second diode (D2) that is connected electrically between the second coil terminal of the control coil (L2) and the control terminal of the second power switch (Q2), and a third power switch (Q3) that has a first switch terminal coupled electrically to the control terminal of the second power switch (Q2), a grounded second switch terminal, and a control terminal coupled electrically to the output terminal of the wave generator 21. Preferably, like the first and second power switches (Q1), (Q2), the third power switch (Q3) is an NMOS transistors. A detailed operation of the preferred embodiment is explained hereinafter with further reference to FIGS. 4 and 5.

During the on subperiod (A) of the first switch control signal 33, the first power switch (Q1) is turned on, inductor coil current flows through the inductor coil (L1), the inductor coil (L1) induces the negative voltage onto the control coil (L2), and the second power switch (Q2) is turned off. At this time, since the first switch control signal 33 provided by the totem pole driving circuit 221 to the control terminal of the first power switch (Q1) corresponds to the periodic control signal provided by the wave generator 21 to the control terminal of the third power switch (Q3), the third power switch (Q3) is turned on simultaneously with the first power switch (Q1). As such, the second power switch (Q2) is pulled to the ground by the third power switch (Q3) so as to ensure that the former is turned off. Conversely, during the off subperiod (B) of the first switch control signal 33, the first and third power switches (Q1), (Q3) are turned off simultaneously, the inductor coil current flowing through the inductor coil (L1) drops to zero, the voltage source (Vin) is coupled to the control terminal of the second power switch (Q2), and the second power switch (Q2) is turned on. After the off subperiod (B) of the first switch control signal 33, the first and third power switches (Q1), (Q3) are turned on simultaneously to repeat the aforementioned operation.

By virtue of the switch controller 22, the periodic turning on and off of the first power switch (Q1) results in a second switch control signal 34 that is 180-degrees out of phase relative to the first switch control signal 33 to the control terminal of the second power switch (Q2) and that has amplitudes varying between 0 volt and a voltage equal to that of the voltage source (Vin), as best shown in FIG. 4. The periodic turning on and off of the first and second power switches (Q1), (Q2) produces a periodic signal 35 that lags the first switch control signal 33 at the junction 230 and that has amplitudes varying between 0 volt and a voltage equal to that of the voltage source (Vin), as best shown in FIG. 5. The periodic signal 35 has a duty cycle that can be adjusted by adjusting the duty cycle of the periodic control signal from the wave generator 21, and produces the rectifier output (Vout) with a voltage less than that of the voltage source (Vin).

It has thus been shown that the power converter module 2 of this invention includes a wave generator 21 that provides a periodic control signal, a rectifier 23 that includes first and second power switches (Q1), (Q2), and a switch controller 22 that interconnects the wave generator 21 and the first and second power switches (Q1), (Q2). The arrangement as such allows the first and the second power switches (Q1), (Q2) to be turned on and off alternately and periodically. Moreover, the switch controller 22 includes a totem pole driving circuit 221 that is relatively simple to implement. As such, the totem pole driving circuit 221 can be laid out directly on a circuit board (not shown) and designed with a desired driving capability. Accordingly, the aforesaid drawbacks of the prior art can be overcome. Further, although the power converter module 2 of this invention is exemplified using only one wave generator 21 that has one output terminal, one rectifier 23, and one switch controller 22 to result in a single-phase arrangement, it should be noted that a wave generator (not shown) that has multiple output terminals, and a plurality of rectifiers 23 with a corresponding number of switch controllers 22 may be used to result in a multi-phase arrangement.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power converter module comprising:
   a wave generator having an output terminal that provides a periodic control signal;
   a rectifier including
      a first power switch having a first switch terminal adapted to be coupled electrically to a voltage source, a second switch terminal, and a control terminal,
      a second power switch having a first switch terminal coupled electrically to said second switch terminal of said first power switch, a grounded second switch terminal, and a control terminal, and
      an LC circuit coupled electrically to said second switch terminal of said first power switch and said first switch terminal of said second power switch, said LC circuit including an inductor coil; and a switch controller coupled electrically to said wave generator and said control terminals of said first and second power switches, said switch controller including a control coil coupled electromagnetically to said inductor coil, said control coil having a first coil terminal adapted to be coupled electrically to the voltage source, and a second coil terminal coupled electrically to said control terminal of said second power switch;

wherein said switch controller provides a switch control signal corresponding to the periodic control signal to said control terminal of said first power switch such that said first power switch is turned on and off periodically;

wherein said inductor coil induces a negative voltage onto said control coil to turn off said second power switch when said first power switch is turned on; and wherein said control coil is adapted to couple the voltage source to said control terminal of said second power switch to turn on said second power switch when said first power switch is turned off.

2. The power converter module as claimed in claim 1, wherein said wave generator is a pulse width modulator.

3. The power converter module as claimed in claim 1, wherein said rectifier is a step-down synchronous rectifier.

4. The power converter module as claimed in claim 1, wherein said first and second power switches are NMOS transistors.

5. The power converter module as claimed in claim 1, wherein said control coil is wound around said inductor coil and in the same direction as said inductor coil such that the negative voltage induced by said inductor coil onto said control coil has a magnitude equal to voltage supplied by the voltage source.

6. The power converter module as claimed in claim 1, wherein said switch controller further includes a totem pole driving circuit interconnecting said output terminal of said wave generator and said control terminal of said first power switch.

7. The power converter module as claimed in claim 1, wherein said switch controller further includes a series connection of a resistor and a diode connected electrically between said second coil terminal of said control coil and said control terminal of said second power switch.

8. The power converter module as claimed in claim 1, wherein said switch controller further includes a third power switch having a first switch terminal coupled electrically to said control terminal of said second power switch, a grounded second switch terminal, and a control terminal coupled electrically to said output terminal of said wave generator.

9. A switch controller for a power converter module, the power converter module including a wave generator and a rectifier, the wave generator having an output terminal that provides a periodic control signal, the rectifier including first and second power switches, the first power switch having a first switch terminal adapted to be coupled electrically to a voltage source, a second switch terminal, and a control terminal, the second power switch having a first switch terminal coupled electrically to the second switch terminal of the first power switch, a grounded second switch terminal, and a control terminal, the rectifier further including an LC circuit coupled electrically to the second switch terminal of the first power switch and the first switch terminal of the second power switch, the LC circuit including an inductor coil, said switch controller being adapted to be coupled electrically to the output terminal of the wave generator and the control terminals of the first and second power switches and comprising:

a totem pole driving circuit adapted to interconnect the output terminal of the wave generator and the control terminal of the first power switch; and a control coil adapted to be coupled electromagnetically to the inductor coil, said control coil having a first coil terminal adapted to be coupled electrically to the voltage source, and a second coil terminal adapted to be coupled electrically to the control terminal of the second power switch;

wherein said totem pole driving circuit is adapted to provide a switch control signal corresponding to the periodic control signal to the control terminal of the first power switch such that the first power switch is turned on and off periodically;

wherein the inductor coil induces a negative voltage onto said control coil to turn off the second power switch when the first power switch is turned on; and wherein said control coil is adapted to couple the voltage source to the control terminal of the second power switch to turn on the second power switch when the first power switch is turned off.

10. The switch controller as claimed in claim 9, wherein said control coil is adapted to be wound around the inductor coil and in the same direction as the inductor coil such that the negative voltage induced by the inductor coil onto said control coil has a magnitude equal to voltage supplied by the voltage source.

11. The switch controller as claimed in claim 9, further comprising a series connection of a resistor and a diode adapted to be connected electrically between said second coil terminal of said control coil and the control terminal of the second power switch.

12. The switch controller as claimed in claim 9, further comprising a third power switch having a first switch terminal adapted to be coupled electrically to the control terminal of the second power switch, a grounded second switch terminal, and a control terminal adapted to be coupled electrically to the output terminal of the wave generator.

* * * * *